United States Patent
Buchanan et al.

(10) Patent No.: US 9,471,539 B2
(45) Date of Patent: Oct. 18, 2016

(54) METHOD AND DEVICES FOR DETERMINING NOISE VARIANCE FOR GYROSCOPE

(75) Inventors: Nathan Daniel Pozniak Buchanan, Waterloo (CA); Robert Oliver, Waterloo (CA); Adam Louis Parco, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 885 days.

(21) Appl. No.: 13/593,581

(22) Filed: Aug. 24, 2012

(65) Prior Publication Data

US 2014/0058704 A1    Feb. 27, 2014

(51) Int. Cl.
  *G06F 17/00* (2006.01)
  *G06F 17/18* (2006.01)
  *G01C 25/00* (2006.01)
  *G01C 19/00* (2013.01)

(52) U.S. Cl.
  CPC ............. *G06F 17/00* (2013.01); *G01C 19/00* (2013.01); *G01C 25/005* (2013.01); *G06F 17/18* (2013.01)

(58) Field of Classification Search
  CPC .... G01C 25/005; G01C 19/56; G01C 19/00; G01C 21/00
  USPC .......... 702/180, 150, 151, 141, 85; 700/279; 701/116; 342/359; 73/1.37; 33/230, 33/318, 321, 323, 324
  See application file for complete search history.

(56) References Cited

U.S. PATENT DOCUMENTS

| | | | |
|---|---|---|---|
| 2008/0022790 A1* | 1/2008 | Lee ..................... | G01C 19/42 74/5.4 |
| 2008/0246662 A1* | 10/2008 | Krulce et al. ................. | 342/359 |
| 2008/0252436 A1 | 10/2008 | Souda | |
| 2012/0004845 A1 | 1/2012 | Kmiecik et al. | |
| 2013/0121367 A1* | 5/2013 | Ahuja et al. ..................... | 374/1 |

OTHER PUBLICATIONS

Lin et al. (An automatic method for estimating noise-induced signal variance in magnitude-reconstructed magnetic resonance images, medical imaging 2005, pp. 1136-1142).*
Extended European Search Report dated Feb. 15, 2013, EP Application No. 12181666.4.
CIPO, CA Office Action relating to Application No. 2,787,975 dated Mar. 25, 2014.
CIPO, CA Office Action relating to Application No. 2,787,975, dated May 6, 2015.
EPO, EP Office Action relating to Application No. 12181666.4, dated Oct. 9, 2015.
CIPO, CA Office Action relating to CA Application No. 2,787,975, dated Apr. 29, 2016.

* cited by examiner

*Primary Examiner* — Regis Betsch
(74) *Attorney, Agent, or Firm* — Rowand LLP

(57) ABSTRACT

Methods and devices for determining a noise variance of an axis of a gyroscope are described. In one aspect, the method includes: representing a plurality of gyroscope readings for the axis in a histogram, the histogram including a plurality of bins associated with respective ranges; determining a bias for the axis of the gyroscope by identifying a concentration of the gyroscope readings within the histogram; and determining a noise variance for the axis of the gyroscope based on the histogram and based on the identified concentration of gyroscope readings.

20 Claims, 6 Drawing Sheets

US 9,471,539 B2

METHOD AND DEVICES FOR DETERMINING NOISE VARIANCE FOR GYROSCOPE

The present disclosure relates generally to gyroscopes, and more particularly, to a method of determining a noise variance for a gyroscope.

BACKGROUND

A gyroscope is a device for measuring rotation. Gyroscopes are sometimes included in electronic devices, such as handheld electronic devices, in order to provide information about the orientation of such electronic devices. Such orientation information allows the electronic device to know information about its own physical position. The gyroscope may allow for recognition of movement within a three dimensional space. The electronic device may use such orientation information as an input signal. That is, the electronic device may be operated in a mode in which gyroscope measurements affect the operation of the electronic device.

Even when a gyroscope is not rotating, the gyroscope may have a signal output. The output, when the gyroscope is not rotating, is referred to as the bias or the bias error. Each sensing axis of the gyroscope may have a different bias. The bias may not be a fixed amount. That is, the bias may vary over time. Such variations may, for example, be caused by changes to the temperature of the electronic device or changes to the operating state of the electronic device. For example, the bias may be affected when the electronic device switches from an off state to an on state.

Gyroscope readings may also be subject to noise. Gyroscope readings may contain random fluctuations that are not due to movement of the gyroscope. That is, even when the gyroscope is stationary, the gyroscope readings obtained from the gyroscope may vary due to the effect of noise.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION OF EXAMPLE EMBODIMENTS

Figure 1:
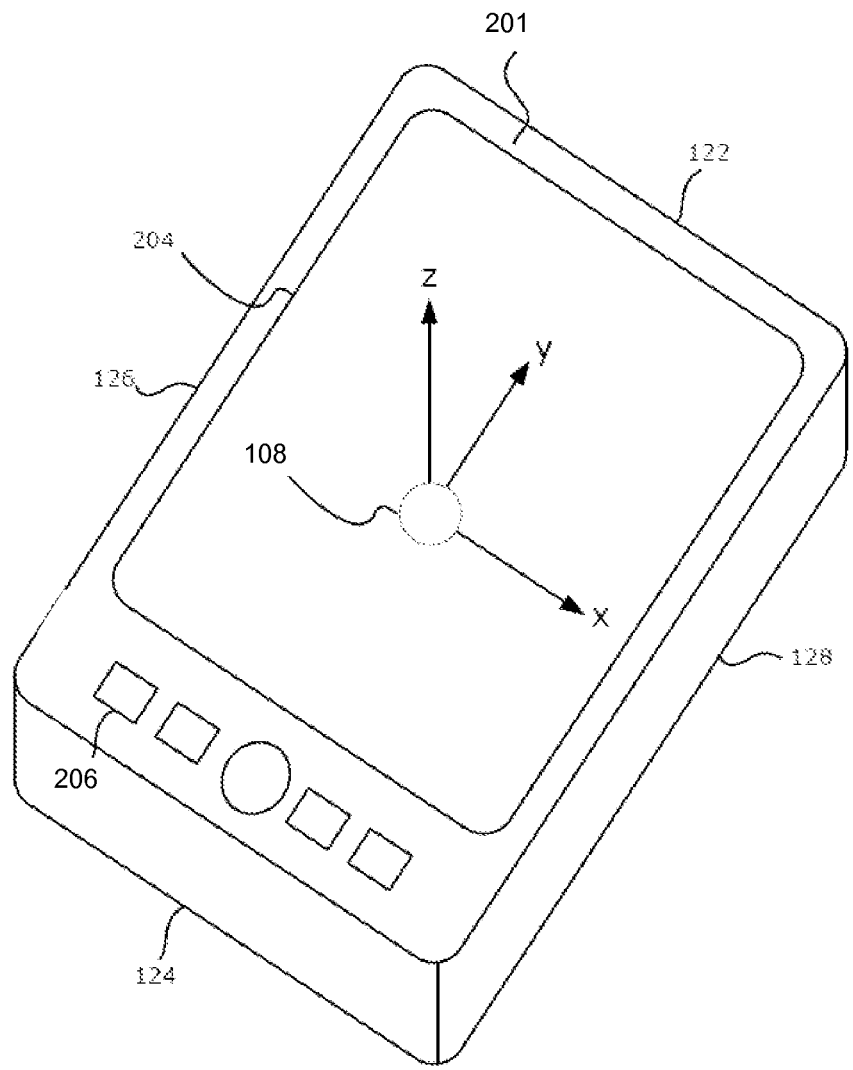
FIG. 1 is a perspective view of an electronic device having a three-axis gyroscope in accordance with example embodiments of the present disclosure.

In one aspect, the present disclosure provides a processor-implemented method of determining a noise variance of an axis of a gyroscope. The method includes: representing a plurality of gyroscope readings for the axis in a histogram, the histogram including a plurality of bins associated with respective ranges; determining a bias for the axis of the gyroscope by identifying a concentration of the gyroscope readings within the histogram; and determining a noise variance for the axis of the gyroscope based on the histogram and based on the identified concentration of gyroscope readings.

In another aspect, the present disclosure describes an electronic device. The electronic device includes a memory for storing a histogram and a gyroscope. The electronic device also includes a processor coupled to the memory and the gyroscope. The processor is configured to: represent a plurality of gyroscope readings for an axis of the gyroscope in the histogram, the histogram including a plurality of bins associated with respective ranges; determine a bias for the axis of the gyroscope by identifying a concentration of the gyroscope readings within the histogram; and determine a noise variance for the axis of the gyroscope based on the histogram and based on the identified concentration of gyroscope readings.

In another aspect, the present disclosure describes a computer readable storage medium. The computer readable storage medium includes computer-executable instructions for: representing a plurality of gyroscope readings for the axis in a histogram, the histogram including a plurality of bins associated with respective ranges; determining a bias for the axis of the gyroscope by identifying a concentration of the gyroscope readings within the histogram; and determining a noise variance for the axis of the gyroscope based on the histogram and based on the identified concentration of gyroscope readings.

Other aspects of the present disclosure will be described below.

Example Electronic Device

Gyroscope measurements may suffer from a bias. Bias (or bias error) is the difference between the ideal output (which is zero) when the gyroscope is not rotating and the actual output when the gyroscope is not rotating. That is, the bias is the gyroscope output when the electronic device is not rotating. If the bias is unknown to an electronic device interpreting the gyroscope output, then the electronic device may erroneously interpret the gyroscope output. For example, the electronic device may believe that the gyroscope output represents a rotation, when the gyroscope is, in fact, not rotating.

When the electronic device which is interpreting the gyroscope output knows the bias, then the electronic device can account for the bias when interpreting the gyroscope output. That is, when the electronic device knows the amount of the bias, the electronic device can effectively cancel out the effect of the bias to ensure that the gyroscope output is correctly correlated to rotation of the gyroscope.

Similarly, gyroscope measurements may also suffer from noise. Noise is the random fluctuations that occur in gyroscope readings that are not caused by movement of the electronic device. The noise may, for example, be caused by random movement of charge carriers (e.g. electrons) carrying current.

The bias for a gyroscope and the noise variance associated with the noise for that gyroscope may be different for each sensing axis of the gyroscope. Accordingly, the bias and noise variance may be determined separately for each sensing axis of the gyroscope and the electronic device which interprets the gyroscope output may cancel the effect of bias (and, in some cases noise variance) on a per-axis basis. Methods and electronic devices for determining the noise variance of a gyroscope will be discussed below.

Referring first to FIG. 1, a gyroscope 108 is shown located within an electronic device 201. The electronic device 201 may take many forms. By way of, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

The electronic device 201 may be any electronic device which makes use of one or more gyroscopes 108. In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. In some embodiments, the display 204 may be a touchscreen display which permits a user to provide input to the electronic device 201 by touching the display 204. That is, the display 204 may act as an input interface 206.

The gyroscope 108 measures rotational velocity of the gyroscope 108. In the embodiment illustrated, since the gyroscope 108 is integrated within the electronic device 201, the gyroscope 108 effectively measures rotational velocity of the electronic device 201.

The gyroscope 108 includes one or more sensing axis. In the embodiment illustrated, the gyroscope 108 includes three orthogonal primary sensing axes denoted x, y and z. Each sensing axis is orthogonal to the other sensing axes. For example, the x sensing axis is orthogonal to the y and z sensing axes, the y sensing axis is orthogonal to the x and z sensing axes and the z sensing axis is orthogonal to the x and y sensing axes.

The gyroscope 108 may produce a gyroscope reading for each of the sensing axes. For example, a gyroscope reading $w_x$ may be produced by the gyroscope based on gyroscope measurements associated with the x sensing axis (such as a rotation about the x sensing axis), a gyroscope reading $w_y$ may be produced by the gyroscope based on gyroscope measurements associated with the y sensing axis (such as a rotation about the y sensing axis), and a gyroscope reading $w_z$ may be produced by the gyroscope based on gyroscope measurements associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes x, y, z of the gyroscope 108. The electronic signal may, for example, provide the gyroscope readings $w_x$, $w_y$, $w_z$ for the sensing axes x, y, z of the gyroscope 108 as measures of an amount of rotation per unit time about each sensing axis. For example, the gyroscope 108 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample. Such samples may be obtained, for example, at regular intervals.

The gyroscope output may separate the gyroscope readings for each sensing axis at a signal level or at an output interface level, or both. For example, in some embodiments, the gyroscope 108 may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin).

In some embodiments, the gyroscope 108 may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

As shown in FIG. 1, the sensing axes x, y, z may be aligned with the form factor of the electronic device 201. In some embodiments, the x sensing axis is aligned along an axis extending along the midpoint of the electronic device 201 between left and right sides 126, 128 of the electronic device 201, the y sensing axis is aligned along an axis extending along the midpoint of the electronic device 201 between top and bottom ends 122, 124, and the z sensing axis extends perpendicularly through the x-y plane defined by the x and y sensing axes at the intersection (origin) of these axes. In this way, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

Figure 2:
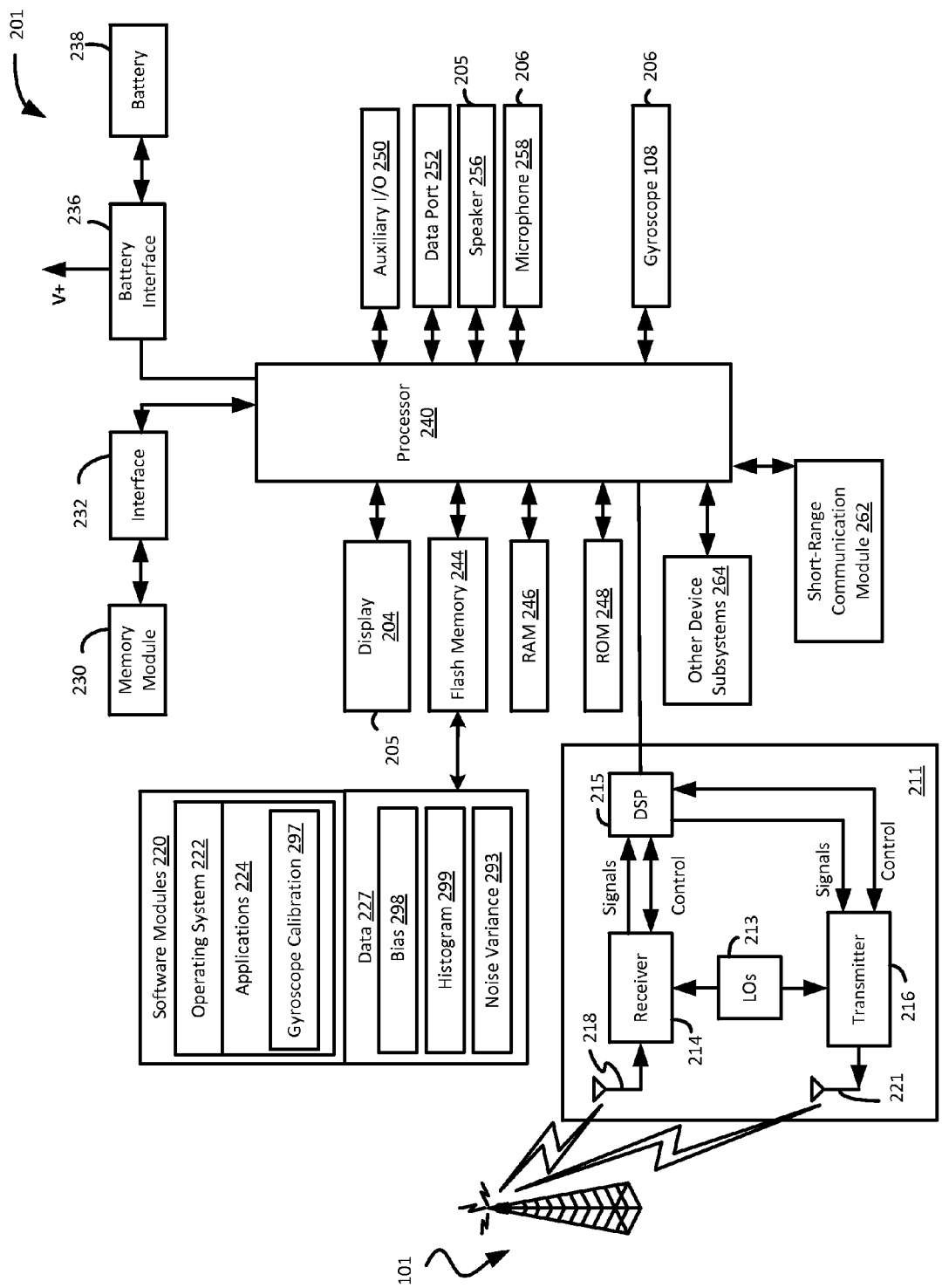
FIG. 2 is a block diagram of example components of an electronic device having a gyroscope in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a gyroscope 108, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 may, in at least some embodiments, include one or more bias 298 values for the gyroscope 108. The bias 298 may identify the bias of the gyroscope 108. The memory may store a plurality of biases 298. For example, the memory may include a bias 298 for each of the sensing axes x, y, z of the gyroscope 108. The gyroscope bias 298 may be used by the electronic device 201 when interpreting an output of the gyroscope 108. That is, the electronic device 201 may be configured to account for the bias 298 when interpreting gyroscope measurements.

The data 227 may, in at least some embodiments, include one or more noise variance 293 values. The noise variance 293 may identify the noise variance of the gyroscope 108. In at least some embodiments, the memory may store a plurality of noise variances 293. For example, the memory may include a noise variance 293 value for each of the sensing axes x, y, z of the gyroscope 108. The noise variance 293 may be used by the electronic device 201 when determining whether a movement of the electronic device 201 has occurred. That is, the electronic device 201 may be configured to account for the noise variance 293 when interpreting gyroscope measurements.

The data 227 may, in at least some embodiments, include one or more histogram 299. The histogram 299 is a representation of past gyroscope readings $w_x$, $w_y$, $w_z$ for a sensing axis. That is, a histogram 299 is associated with one of the sensing axes. While a single histogram 299 is illustrated in FIG. 2, the data 227 may include a greater number of histograms 299 in other embodiments. For example, the data 227 may, in at least some embodiments, include a histogram 299 for each sensing axis of the gyroscope 108. Accordingly, in the example embodiment of FIG. 1 in which the gyroscope 108 is a three-axis gyroscope 108, the data 227 may include three histograms. An x-axis histogram 299 may be associated with the x sensing axis of the gyroscope 108, a y-axis histogram 299 may be associated with the y sensing axis of the gyroscope 108, and a z-axis histogram 299 may be associated with the z sensing axis of the gyroscope 108.

As will be described in greater detail below, the histograms 299 may be created, maintained, and/or used by a software application or module, such as a gyroscope calibration application 297.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes or is connectable to a power source, such as a battery 238. The battery 238 may be one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

The electronic device 201 includes a gyroscope 108 which is configured to sense rotation of the electronic device 201. The gyroscope 108 may, in at least some embodiments, be a three-axis gyroscope of the type described above with reference to FIG. 1.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, a gyroscope calibration application 297.

In the example embodiment of FIG. 2, the gyroscope calibration application 297 is illustrated as being implemented as a stand-alone application 224. However, in other example embodiments, the gyroscope calibration application 297 could be provided by another application or module such as, for example, the operating system software 222. Furthermore, while the gyroscope calibration application 297 is illustrated with a single block, the functions or features provided by the gyroscope calibration application 297 could, in at least some embodiments, be divided up and implemented by a plurality of applications and/or modules.

Furthermore, while, in the example embodiment of FIG. 2, the gyroscope calibration application 297 is illustrated as being associated with the main processor 240 of the electronic device 201, in other embodiments, the gyroscope calibration application 297 could be associated with another processor, or group of processors. For example, in some embodiments, the gyroscope 108 may include or be connected to a secondary processor. The secondary processor may provide a narrow set of functions or features and may be used to offload some processing from the main processor 240. For example, in some embodiments, the secondary processor is a gyroscope-specific processor which is coupled to the gyroscope 108 and which is configured to provide gyroscope related functions such as those provided by the gyroscope calibration application 297. For example, the secondary processor may be configured to determine the bias 298 and/or noise variance 293 of the gyroscope in the manner described herein and may, in at least some embodiments, be configured to correct for the bias 298 (and/or noise variance 293). For example, the secondary processor may separate and remove the effect of the bias 298 from gyroscope readings and may provide the resulting corrected gyroscope readings to the main processor 240 for further analysis and/or interpretation. In at least some embodiments, the secondary processor may determine whether a gyroscope reading represents a movement of the electronic device 201 based on the bias 298 and the noise variance 293.

The gyroscope calibration application 297 may be configured to determine the bias 298 and/or noise variance 293 for a gyroscope 108. The gyroscope calibration application 297 is configured to dynamically determine the bias 298 and/or the noise variance 293. More particularly, since bias 298 can change over time (for example, due to temperature variations, age of the electronic device 201, voltage, etc.), the gyroscope calibration application 297 repeatedly determines a bias 298 and may, in at least some embodiments, repeatedly determine a noise variance 293. That is, in at least some embodiments, in order to account for changes in the bias 298 (and/or noise variance 293), the gyroscope calibration application 297 may determine the bias 298 (and/or noise variance 293) a number of times. In at least some embodiments, the gyroscope calibration application 297 continually operates (e.g. runs in the background) to monitor changes in the bias 298 and/or noise variance 293.

While a single bias 298 and noise variance 293 are illustrated in FIG. 2, the gyroscope calibration application 297 may, in at least some embodiments, determine a bias 298 and/or noise variance 293 for each sensing axis x, y, z of the gyroscope 108. For example, the gyroscope calibration application 297 may determine three biases 298 for a three-axis gyroscope 108. Similarly, the gyroscope calibration application 297 may determine three noise variances for a three-axis gyroscope.

In at least some embodiments, the gyroscope calibration application 297 is configured to use histograms 299 to determine the biases 298 and the noise variances 293. As will be described in greater detail below with reference to FIGS. 3 to 7, the gyroscope calibration application 297 may be configured to cause the electronic device to track gyroscope readings using the histograms. Each sensing axis of the gyroscope 108 may have a separate histogram 299 associated therewith which may be used for tracking the gyroscope readings associated with that axis.

Accordingly, in at least some embodiments, the gyroscope calibration application 297 may determine the bias 298 for an axis of the gyroscope 108 by representing a plurality of gyroscope readings for that axis in a histogram 299. The histogram 299 may then be used to determine the bias 298 for that axis. The use of a histogram 299 may allow a bias 298 to be easily identified. That is, the bias 298 may be identified by looking for an area of the histogram 299 which has a high concentration of readings (e.g. by identifying the most significant bin).

Since the histogram 299 represents gyroscope readings which are obtained over time, the histogram 299 will represent both periods of rotation and periods of no rotation. That is, the histogram will include gyroscope readings from periods when the gyroscope 108 (and hence the electronic device 201) is rotating and gyroscope readings from periods when the gyroscope 108 (and hence the electronic device 201) is not rotating. The rate of rotation during the periods of rotation tends to vary since a user will not typically be rotating the electronic device 201 at a constant rate. Accordingly, the gyroscope readings during the periods of rotation may vary widely across the gyroscope's range. However, during the periods without rotation, the gyroscope readings will reflect the bias 298. Thus, over time, the histogram 299 reflects a concentration of gyroscope readings at the bias 298. The gyroscope calibration application 297 may use the histogram 299 to identify such a point of concentration and, consequently, identify the bias 298.

Figure 4:
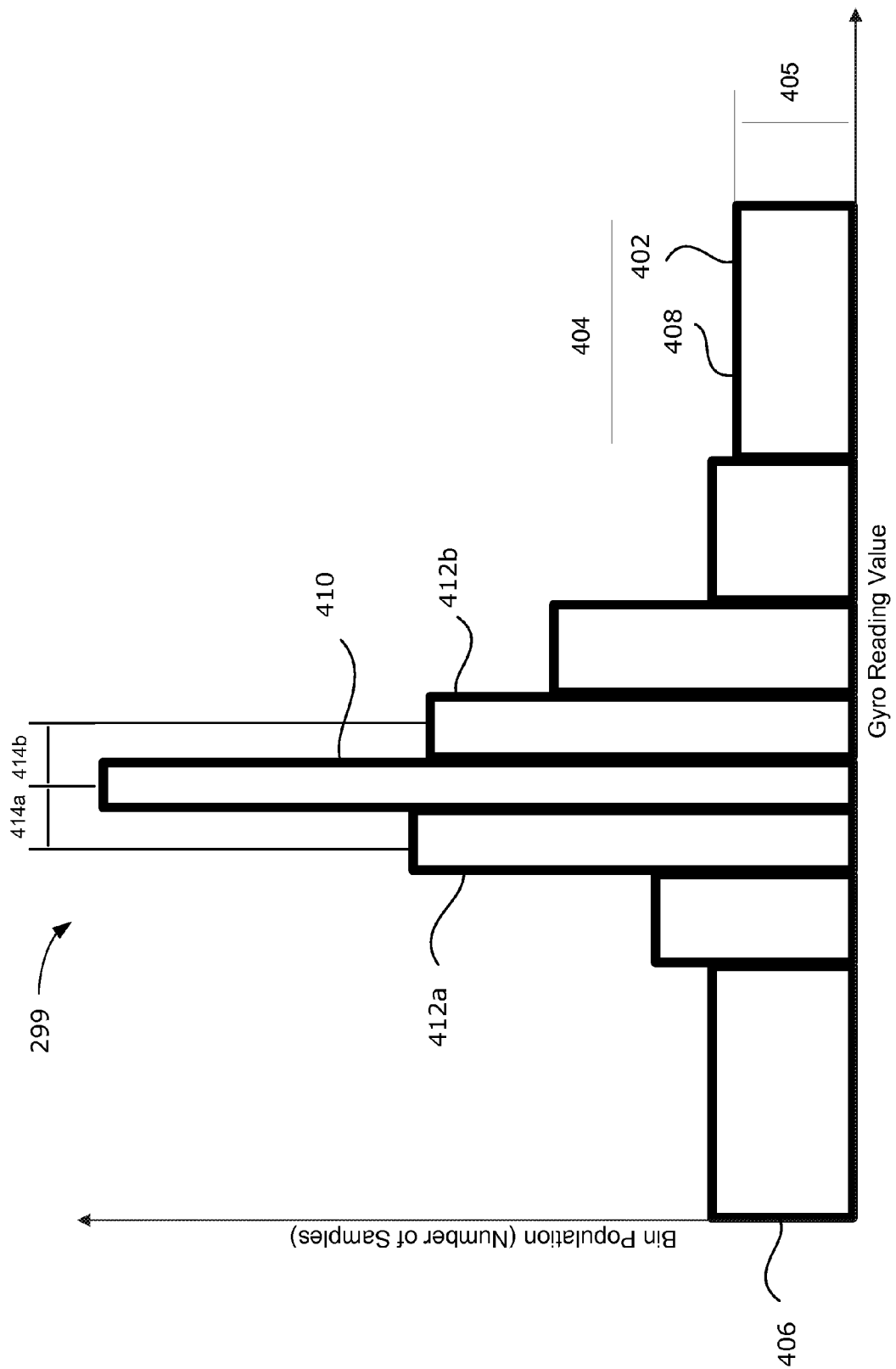
FIG. 4 is an example histogram which may be used to determine a noise variance of a gyroscope in accordance with example embodiments of the present disclosure.

The high concentration of gyroscope readings may be identified, for example, by identifying a most significant bin 410 (FIG. 4) in the histogram 299. The most significant bin is identified based on the bin population 405 (FIG. 4) for the bins 402 (FIG. 4) and the width 404 (FIG. 4) for the bins 402 (FIG. 4). For example, in some embodiments, the gyroscope calibration application 297 may determine the most significant bin by calculating a bin significance score for each of the bins. The bin significance score for a bin may be calculated by dividing the bin population for the bin by the width of the bin. Accordingly, the bin significance score varies directly with the bin population and inversely with the width of the bin. The bin having the highest bin significance score may be selected as the most significant bin 410 (FIG. 4).

The histogram 299 may also be used by the gyroscope calibration application 297 to determine the noise variance 293. More particularly, in at least some embodiments, the electronic device 201 may determine that the bins of a histogram that are adjacent to the bin of the histogram that contains the bias represent noise. The electronic device 201 may consider the noise of the gyroscope 108 to be Additive White Gaussian Noise (AWGN) and may determine the noise variance by modelling the noise as AWGN. As will be explained in greater detail below, the bins of the histogram 299 that are adjacent to the bin of the histogram that contains the bias may be considered to be noise bins. That is, these adjacent bins may be considered to represent the noise of the gyroscope 108. Data from these noise bins may be fitted to a Gaussian curve to determine the noise variance.

In at least some embodiments, based on the bias 298 and the noise variance 293, the electronic device 201 may identify movements of the electronic device 201. That is, the noise variance 293 and the bias 298 may effectively be used to determine one or more thresholds. These thresholds may be used for differentiating between a movement of the electronic device 201 and a non-movement of the electronic device 201.

In at least some embodiments, the gyroscope calibration application 297 may perform one or more maintenance operations on the histogram 299. The maintenance operations may be used to improve the efficiency of the histogram 299. That is, the maintenance operations may be used to improve the speed at which the histogram 299 may be used to identify a bias 298 and/or a noise variance 293, and/or the accuracy of the bias 298 and/or noise variance 293 which is identified.

For example, in at least some embodiments (which will be described in greater detail below with reference to FIG. 6), the gyroscope calibration application 297 may be configured to adapt bin widths of the histogram 299 if one or more predetermined conditions is satisfied. That is, the gyroscope calibration application 297 may adjust the range of some of bins of the histogram. This may be done, for example, by splitting a single bin into two or more bins and by merging two or more bins which are adjacent to each other into a single bin. In at least some embodiments, during such bin width adaptation, the number of bins in the histogram 299 remains fixed. That is, the number of bins before bin width adaptation is performed is the same as the number of bins after bin width adaptation is performed. Each bin that is split into two bins may be offset by combining two bins together so that the net number of bins is the same. Accordingly, the bins in the histogram may have different widths.

Bin width adaptation may be used to allow the histogram 299 to better focus on areas of concentration in the histogram 299. That is, adaptation allows a bin which includes gyroscope readings representing the bias 298 to be made narrow and allows bins further away from the bias point to be made much wider. A narrow bin width for the bin which includes gyroscope readings representing the bias allows the bias to be easily estimated once that bin is identified.

Since the bin significance score of a bin varies inversely with the bin width but directly with the bin population, the bin width adaptation will not unduly affect the bin significance scores. That is, when bins are combined due to the adaptation, the resulting bin has a larger width (which tends to decrease the bin significance score), but also has a larger bin population (which tends to increase the bin significance score). Similarly, when bins are split due to the adaptation, the resulting bins each have a smaller width (which tends to increase the bin significance score) but also have smaller bin populations (which tends to decrease the bin significance score). Accordingly, the effect of the bin width adaptation on the bin significance scores may be minimal.

In at least some embodiments, the gyroscope calibration application 297 may be configured to maintain the histogram 299 by occasionally reducing the population of the histogram 299. That is, the gyroscope calibration application 297 may reduce the population of the histogram 299 if one or more conditions are met. For example, in some embodiments, if the bin population of the largest bin (the bin with the highest bin population) exceeds a predetermined threshold, then the gyroscope calibration application 297 may effectively reduce the size of the bins. The population of all bins in the histogram 299 may, in at least some embodiments, be reduced by the same factor. For example, in some embodiments, the bin population of all bins is reduced by a factor of two. Bin reduction will be described in greater detail below with reference to FIG. 7.

Further functions and features of the gyroscope calibration application 297 will be described in greater detail below with reference to FIGS. 3 to 7.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Obtaining Gyroscope Bias

In the description which follows, reference will be made to methods 300, 500, 600, 700 which are illustrated in FIGS. 3 and 5 to 7. Any one or more of these methods 300, 500, 600, 700 may include features which may be provided by an electronic device 201, such as the electronic device 201 of FIGS. 1 and 2. For example, one or more applications or modules associated with an electronic device 201, such as the gyroscope calibration application 297 (FIG. 2), may contain processor readable instructions for causing a processor associated with the electronic device 201 to perform one or more operations of the methods 300, 500, 600, 700 of FIGS. 3 and 5 to 7. That is, in at least some example embodiments, the electronic device 201 may be configured to perform one or more of the methods 300, 500, 600, 700.

For example, one or more of the methods 300, 500, 600, 700 may be implemented by a processor 240 (FIG. 2) of an electronic device 201 (FIG. 2).

In at least some embodiments, one or more of the functions or features of one or more of the methods 300, 500, 600, 700 may be performed, in whole or in part, by another system, software application, module, component or device apart from those specifically listed above. For example, in some embodiments, one or more of the methods 300, 500, 600, 700 may be performed by a processor associated with the gyroscope 108. That is, in at least some embodiments, one or more of the methods 300, 500, 600, 700 or a portion thereof may be performed by a processor other than the main processor the electronic device 201. A processor which is associated with the gyroscope 108 and which may be used for the specific purpose of controlling the gyroscope 108 (i.e. a gyroscope-specific processor) may be configured to perform one or more of the methods 300, 500, 600, 700 or a portion thereof.

Figure 3:
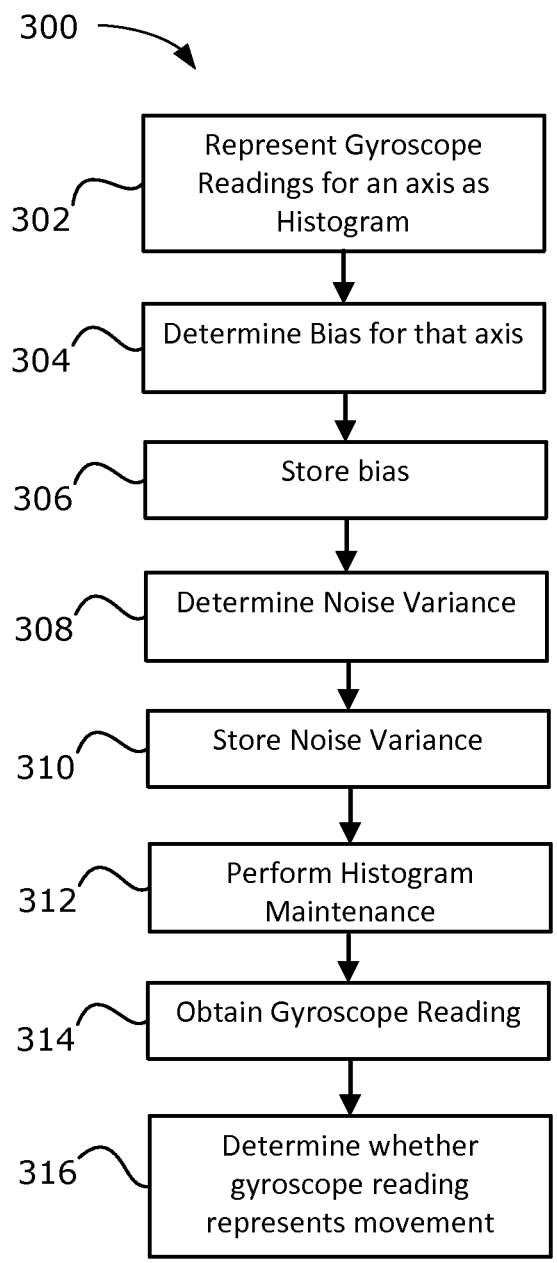
FIG. 3 is a flowchart of an example method for obtaining a noise variance for an axis of a gyroscope in accordance with example embodiments of the present disclosure.

Referring first to FIG. 3, a method 300 of determining a noise variance for an axis of a gyroscope 108 is illustrated. In the embodiment illustrated, the method 300 may be performed to obtain the noise variance 293 for an axis of the gyroscope 108. The method 300 may be performed repeatedly to obtain noise variances 293 for all axes of the gyroscope 108.

At 302, the electronic device 201 represents a plurality of gyroscope readings for an axis of the gyroscope 108 in a histogram 299. An example histogram 299 will be described below with reference to FIG. 4. As will be described in greater detail below with reference to FIG. 4, the histogram 299 includes a plurality of bins that are associated with respective ranges. That is, each bin has a range which is associated with that bin. The range of the bin defines gyroscope readings which are considered to be included within that bin. That is, the ranges of the bins define boundaries which are used to separate gyroscope readings into the bins.

Accordingly, at 302, the electronic device 201 effectively builds a histogram 299 which includes past gyroscope readings for the axis. The histogram 299 represents the number of times a gyroscope reading was within each of the ranges of the bins of the histogram 299. That is, the histogram 299 is used to track past gyroscope readings to allow for easy identification of highly concentrated gyroscope reading values.

The histogram 299 which is generated at 302 may have a small number of bins. For example, in some embodiments, the number of bins is less than twenty. In some embodiments, the number of bins is less than ten. In some embodiments, the histogram 299 includes eight bins. A small number of bins may allow gyroscope readings to be assigned to a bin rapidly and may allow for easier evaluation of bins when determining the bias 298 and/or noise variance 293 from the histogram 299.

An example method for adding a gyroscope reading for an axis to the histogram for that axis will be described in greater detail below with reference to FIG. 5. That is, a method 500 of generating a histogram 299 based on gyroscope readings will be described in greater detail below.

At 304, the bias 298 is determined for the axis of the gyroscope 108 which is associated with the histogram 299 obtained at 302. The bias 298 is determined by identifying a concentration of the gyroscope readings within the histogram 299. That is, the bias 298 is determined by looking for an area of the histogram 299 where there are a large number of gyroscope readings within a small range.

In at least some embodiments, the bias 298 for the axis of the gyroscope may be determined, at 304, based on bin populations of the bins. The bin population for a bin identifies a total number of gyroscope readings associated with that bin. The bias 298 may, in at least some embodiments, also be determined based on bin widths for the bins.

For example, in some embodiments, the electronic device 201 may, at 304, identify a most significant bin 410 (FIG. 4) for the histogram 299. The most significant bin is identified based on the bin population for the bins and the width for the bins. For example, in some embodiments, the gyroscope calibration application 297 may determine the most significant bin by calculating a bin significance score for each of the bins. The bin significance score for a bin may be calculated by dividing the bin population for the bin by the width of the bin. Accordingly, the bin significance score varies directly with the bin population and inversely with the width of the bin. The bin having the highest bin significance score may be selected as the most significant bin.

After identifying the most significant bin, the electronic device 201 may determine the bias 298 for an axis of the gyroscope 108 based on the identified most significant bin. For example, the electronic device 201 may determine the bias 298 for the gyroscope 108 by averaging the gyroscope readings in the most significant bin. That is, the bias may be determined as the average of the values of the gyroscope readings which were included in the most significant bin.

In at least some embodiments, at 306, after the bias 298 is determined, the bias 298 may be stored in memory of the electronic device 201 and/or used in subsequent gyroscope measurements. That is, the electronic device 201 may compensate for the bias 298 when gyroscope readings are obtained. That is, the effect of the bias may be removed from subsequent gyroscope readings.

At 308, the electronic device 201 may determine the noise variance 293 for the gyroscope 108. The noise variance 293 may be determined based on the histogram 299 and also based on the concentration of bin readings that was identified at 304. More particularly, the variance may be determined based on the bias determined at 304 and based on other features of the histogram 299 which will be described below.

In at least some embodiments, the electronic device 201 may identify one or more bins of the histogram 299 that are adjacent to the bin containing the bias 298 (i.e. bins that are adjacent to the most significant bin). Typically, there will be two such bins—one to the left of the bin containing the bias and one to the right of the bin containing the bias. These bins may be referred to as noise bins 412a, 412b (FIG. 4) since they represent the effect of noise on gyroscope readings. Thus, the electronic device 201 may determine that the bins that are adjacent to the bin containing the bias represent noise associated with the gyroscope.

The electronic device 201 may then use these identified noise bins 412a, 412b (FIG. 4) to determine the noise variance 293. More particularly, since the noise is typically AWGN, which may be represented using a Gaussian probability distribution function, the electronic device 201 may fit bin data associated with the noise bins to a Gaussian curve and may determine the noise variance 293 based on the Gaussian curve. More particularly, the electronic device 201 may treat the most significant bin 410 (FIG. 4) as being located at the center of the Gaussian curve since this bin represents the apex of the Gaussian curve. Then, the electronic device 201 determines the noise variance by solving a Gaussian probability distribution function.

More specifically, the Gaussian probability distribution function that is centered at zero may be written as:

$$P(x) = \frac{1}{\sqrt{2\pi(\text{variance})}} e^{-\frac{1}{2}x^2},$$

where P(x) is the power of a bin which may also be referred to as a bin significance score.

This equation may be solved using known values for P(x), such as the bin significance scores for the bin containing the bias and the bin significance scores for the bins adjacent to the bin containing the bias (i.e. the noise bins).

More specifically, the noise variance may be determined as:

$$\text{variance} = \frac{D^2}{2 \log_e \left( \frac{P(\text{Bias})}{P(\text{Adjacent})} \right)},$$

where D is a representation of the distance between the bin containing the bias (i.e. the most significant bin) and the bins adjacent to the bin containing the bias (i.e. the noise bins), P(Bias) is the bin significance score associated with the bin of the histogram containing the bias, P(Adjacent) is the average bin significance score associated with bins adjacent to the bin containing the bias (or, in some embodiments, P(Adjacent) may be the bin significance score associated with one of the bins that is adjacent to the bin containing the bias).

The bin significance score for a bin may be calculated by dividing the bin population for the bin by the width of the bin. Accordingly, the bin significance score varies directly with the bin population and inversely with the width of the bin.

In at least some embodiments, to determine the noise variance 293, the electronic device identifies the distance between the bin containing the bias (i.e. the most significant bin) and one or more of the adjacent bins. Since noise is typically present in a Gaussian distribution, the distance 414a, 414b (FIG. 4) between both noise bins and the bin containing the bias (i.e. the most significant bin) will typically be approximately the same. As illustrated in FIG. 4, these distances 414a, 414b may be measured from the center of the noise bins 412a, 412b to the center of the most significant bin. The distances 414a, 414b may, in at least some embodiments, be averaged to obtain the representation of the distances, D, that will be used to obtain the noise variance 293. The distance, D, that is used in the equation for noise variance 293 above is a measure of the difference between the average gyroscope readings contained in the noise bins and the average gyroscope readings contained in the bin containing the bias. Thus, in at least some embodiments, the distance, D, is a measure of the how far apart the gyroscope readings in the noise bin are from those in the bias bin.

In order to solve the equation above and determine the noise variance 293, in at least some embodiments, the electronic device 201 identifies a bin population associated with the bin of the histogram containing the bias (i.e. the most significant bin). The electronic device may also identify the width of the bin containing the bias and may determine a bin significance score for the bin containing the bias based on the bin population and the width of the bin containing the bias (i.e. it may determine P(bias)).

Similarly, the electronic device 201 may identify one or more bin populations associated with one or more bins that are adjacent to the bin of the histogram 299 containing the bias (i.e. the most significant bin) and widths associated with those bins. Using the bin populations and widths, a bin significance score may be determined for the bins that are adjacent to the bias bin (i.e. for the noise bin). The bin significance scores of the bins that are adjacent to the bin containing the bias may be averaged to produce a value, P(Adjacent), that will be used to determine the noise variance.

After the electronic device 201 identifies the information referred to above (i.e. a distance, D, representing the distance between the bin containing the bias and the bins adjacent to the bias bin, a bin significance score, P(bias), associated with the bin of the histogram containing the bias, and bin significance scores associated with the bin containing the bias and bin(s) adjacent to the bin containing the bias), the electronic device 201 may then determine the noise variance 293 based on these values. For example, the electronic device 201 may use these identified values in the variance equation provided above to determine the noise variance 293.

In some embodiments (not shown), the electronic device 201 may perform a check before determining the noise variance. More particularly, the electronic device 201 may determine whether the histogram contains enough data to be useful for estimating the noise variance. In at least some embodiments, the electronic device 201 may do so by comparing the number of gyroscope readings in the histogram 299 to a predetermined threshold. Based on the comparison, the electronic device 201 may determine whether the histogram contains too few gyroscope readings to be reliable. For example, in some embodiments, if the number of gyroscope readings represented by the histogram is less than a predetermined threshold, then the electronic device 201 may determine that the histogram 299 contains too few readings to be reliable. When this happens, the electronic device 201 may generate an error. The error may be generated instead of or in addition to the step 308 of determining the noise variance. For example, in some embodiments, the noise variance may not be determined when the error is generated. In other embodiments, the noise variance may be determined even when the error is generated. In such embodiments, the error effectively indicates that the noise variance may be unreliable.

In at least some embodiments, at 310, after the noise variance 293 is determined, the noise variance 293 may be stored in memory of the electronic device 201.

In some embodiments, at 312, the electronic device may perform histogram maintenance on the histogram 299. That is, at 312, one or more maintenance operations may be performed on the histogram 299. The maintenance operations may be used to improve the efficiency of the histogram 299. That is, the maintenance operations may be used to improve the speed at which the histogram 299 may be used to identify a bias 298, and/or the accuracy of the bias 298 which is identified.

As will be described in greater detail below with reference to FIG. 6, in at least some embodiments, at 312, the electronic device 201 may improve precision in concentrated areas of the histogram 299 by adapting bin widths. As will be described in greater detail below with reference to FIG. 7, in at least some embodiments, at 312, the electronic device 201 may reduce the size of the histogram 299.

After the noise variance 293 and bias 298 have been determined, these values may be used for determining whether a gyroscope reading represents movement. For example, at 314 a gyroscope reading may be obtained and, at 316, the electronic device 201 may determine, based on the gyroscope reading, the bias 298 and the noise variance 293, whether the gyroscope reading represents a movement of the gyroscope 108.

In order to determine whether the gyroscope reading represents a movement, the electronic device 201 may determine a measure of the difference between the gyroscope reading and the bias 298. For example, the electronic device may determine a square of the difference between the bias 298 and the gyroscope reading. The electronic device 201 may also determine a variance threshold as the product of the noise variance and a predetermined value. For example, the variance threshold may be determined by multiplying the noise variance 293 by a predetermined factor. Then, the electronic device 201 may determine whether the difference between the gyroscope reading and the bias is greater than the variance threshold. If so, the electronic device 201 may determine that the gyroscope reading represents a movement of the gyroscope. If not, then the electronic device 201 may determine that the gyroscope reading does not represent a movement of the gyroscope.

In at least some embodiments, the method 300 may be repeated. That is, the method 300 may be performed multiple times in order to ensure that the determined bias and/or noise variance remains accurate. For example, the method 300 may, upon completing, resume operation again at 302. Similarly, after a bias and/or noise variance is established, 314 and 316 may operate in parallel with other features of the method. That is, the electronic device 201 may continue to update the bias, noise variance, and/or histogram according to features 302 through 312 and may, at the same time, determine whether the electronic device 201 is moving using features 314 and 316.

Example Histogram

Referring now to FIG. 4, at example histogram 299 is illustrated. The example histogram 299 includes a plurality of bins 402. For the sake of clarity, only a single bin has been labelled.

The example histogram 299 illustrates the bin population of each bin (illustrated on the y-axis). For the sake of clarity, only a single bin population 405 has been labelled. Each bin 402, has an associated bin population 405. The bin population 405 is a measure of the number of gyroscope readings which were included in the bin 402. That is, the bin population 405 illustrates the number of samples which were considered to fall within the bin 402.

In the example histogram 299, the x-axis has been used to represent gyroscope reading values which are considered to be associated with that bin. That is, the x-axis of the histogram 299 effectively illustrates the range of each bin 402. It will be appreciated that, in other examples, the histogram 299 may be represented so that the x-axis represents a bin number instead of the range of gyroscope reading values for the bin.

Each bin 402 has an associated bin width 404 (only one of which has been labelled). The bin width 404 is defined by the range of the bin. That is, the bin width 404 is the difference between an upper limit for gyroscope readings which are considered to be associated with the bin 402 and a lower limit for gyroscope readings which are considered to be associated with the bin 402.

Two bins may be considered to be extreme bins 406, 408. The extreme bins 406, 408 are the bins which are at the outside of the histogram 299. The extreme bins include a lower extreme bin 406 and an upper extreme bin 408. The extreme bins 406 and 408 effectively define the range of the histogram 299. A lower limit of the range of the lower extreme bin 406 defines a lower limit associated with the histogram 299 and an upper limit of the range of the upper extreme bin 408 defines an upper limit associated with the histogram 299.

One of the bins may be considered to be a most significant bin 410. The most significant bin 410 identifies a point of concentration in the histogram 299. That is, the most significant bin 410 is a bin 402 having the best combination of bin width and bin population. Methods of identifying which bin 402 is the most significant bin 410 are described in greater detail with reference to FIG. 3.

The bins adjacent to the most significant bin 410 are the noise bins 412a, 412b. These noise bins are immediately adjacent to the most significant bin 410. One of the noise bins 412a is to the left of the most significant bin 410 and one of the noise bins 412b is to the right of the most significant bin 410.

FIG. 4 also illustrates distances 414a, 414b between the noise bins 412a, 412b and the most significant bin 410. As illustrated in FIG. 4, these distances 414a, 414b may be measured from the center of the noise bins 412a, 412b to the center of the most significant bin. These distances 414a, 414b may be used as described above with reference to FIG. 3 for determining the noise variance 293 of a gyroscope. In another embodiment, these distances 414a, 414b may be measured from the mean value of the noise bins 412a, 412b to the mean value of the most significant bin (The mean value for each bin is taken to be the sum of the samples in the bin divided by the number of samples in the bin).

Obtaining Histogram

Figure 5:
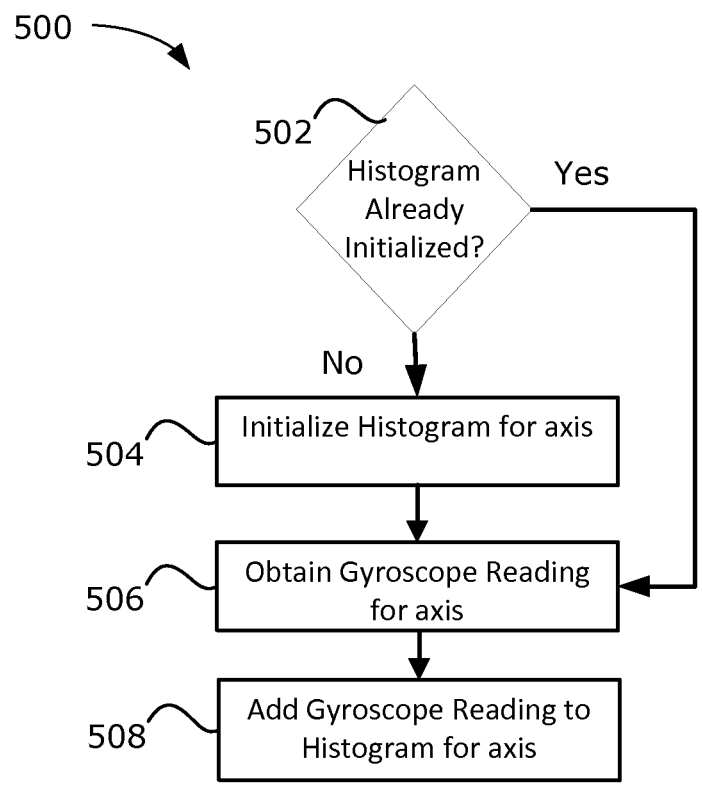
FIG. 5 is a flowchart of an example method for adding a gyroscope reading to a histogram in accordance with example embodiments of the present disclosure.

Referring now to FIG. 5, a method 500 for obtaining a histogram 299 is illustrated in flowchart form. The method 500 may, for example, be performed at 302 of the method of FIG. 3.

At 502, the electronic device 201 may, in some embodiments, determine whether the histogram 299 is already initialized. For example, the electronic device 201 may determine whether the memory of the electronic device 201 already includes the histogram 299 or whether a new histogram 299 must be created.

If the histogram 299 is not already initialized then, at 504, the histogram 299 may be initialized. In at least some embodiments, the histogram 299 may be initialized by storing, in memory, a histogram 299 having one or more default properties. For example, the histogram 299 may have a default number of bins, each having default ranges. In at least some embodiments, the histogram 299 may be created so that all bins 402 initially have the same bin width 404. The bin population 405 for the bins 402 of the newly created histogram 299 may initially be nil.

After a histogram 299 is initialized (i.e. after a new histogram is initialized at 504 or if it is determined at 502 that a histogram is already initialized), then at 506, a gyroscope reading for may be obtained for the axis of the gyroscope 108 associated with the histogram 299. That is, the gyroscope 108 may be sampled in order to obtain a gyroscope reading (which may also be referred to as a sample).

At 508, the gyroscope reading may be added to the histogram 299. That is, the histogram 299 may be updated to reflect the additional gyroscope reading. More particularly, the electronic device 201 may use the ranges associated with the bins of the histogram 299 to assign the gyroscope reading to a specific one of the bins 402. That is, an appropriate bin for the gyroscope reading is identified based on the ranges of the bins 402. A bin population 405 for identified bin may be updated to reflect the fact that the bin 402 has a new bin member.

In some embodiments, a sum of gyroscope readings within each bin 402 may be maintained by the electronic device 201. For example, rather than track all of the individual gyroscope readings associated with a bin 402, the electronic device 201 may instead maintain a sum of the gyroscope readings which were associated with that bin 402. The sum of the readings, when coupled with the bin population 405 allows an average gyroscope reading for a bin to be determined. As noted in the discussion of 304 of the method 300 of FIG. 3 above, the average gyroscope reading for the most significant bin 410 may provide the bias.

In some embodiments and in some situations, a gyroscope reading may be obtained which falls outside of the range of the histogram 299. In some such embodiments, the reading may be ignored. In other embodiments, if a gyroscope reading is outside of a range of the histogram, the electronic device 201 may automatically increase the range of one of the extreme bins 406, 408 of the histogram so that the gyroscope reading may be included in that bin.

The method 500 of FIG. 5 may be repeatedly performed in order to provide a well-populated histogram 299 which yields an accurate estimate of bias 298.

Adapting Bin Widths

Figure 6:
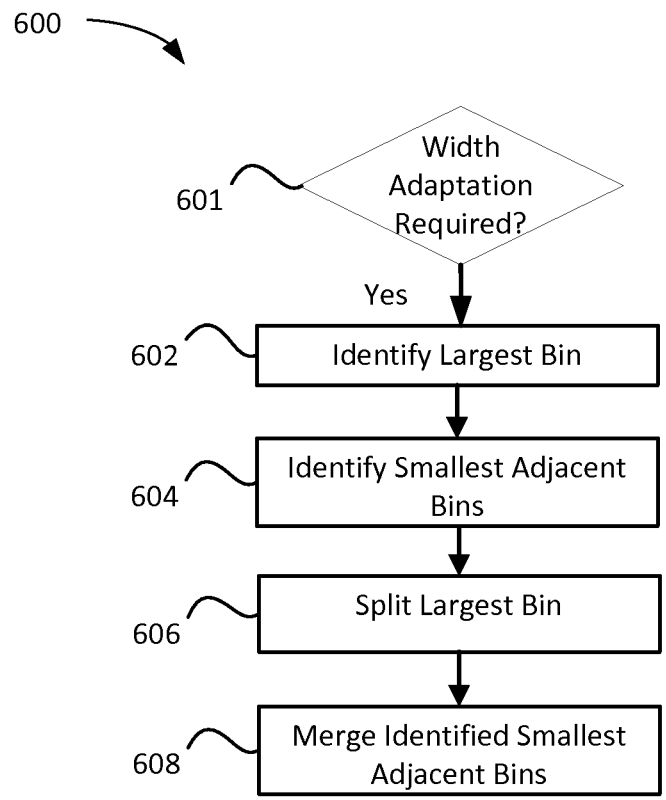
FIG. 6 is an example method of performing bin width reduction in accordance with example embodiments of the present disclosure.

Referring now to FIG. 6, a method 600 of adapting bin widths 404 of a histogram 299 is illustrated in flowchart form. The method 600 may, for example, be performed at 312 of the method 300 of FIG. 3.

At 601, the electronic device 201 determines whether width adaptation is required. The electronic device 201 may make this determination based on one or more predetermined criteria. The predetermined criteria may consider, for example, the bin population of the bin having the largest bin population. The predetermined criteria may also consider, for example, the sum of the bin populations for a pair of adjacent bins of the histogram which collectively contain fewer gyroscope readings than any other pair of adjacent bins. For example, in some embodiments, the electronic device 201 may determine the ratio of the bin population of the bin having the largest bin population to the sum of the bin populations for the pair of adjacent bins which collectively contain fewer gyroscope readings than any other pair of adjacent bins. If this ratio exceeds a threshold, then the electronic device 201 may determine that bin width adaptation is required.

If bin adaptation is required, then at 602, the electronic device 201 may identify the bin 402 of the histogram 299 containing the greatest number of gyroscope readings and may, at 604, identify the pair of adjacent bins of the histogram 299 which collectively contain fewer gyroscope readings than any other pair of adjacent bins.

At 606, the electronic device 201 may split the largest bin into two bins. That is, the electronic device may form two bins from the single largest bin. The bin width of each of the newly formed bins may be half the bin width of the largest bin. In some embodiments, the bin population of each of the newly formed bins is half the bin population of the largest bin. Similarly, if the electronic device 201 maintains a sum of gyroscope readings associated with each bin, then the sums for the new bins may be half of the sum from the largest bin.

At 608, the electronic device 201 may merge the pair of adjacent bins identified at 604. That is, the electronic device 201 may combine these two bins so that these two bins now become one bin. The bin width of the newly formed bin may be the sum of the bin widths of both bins in the pair. Similarly, the bin population of the newly formed bin may be the sum of the bin populations for both bins in the pair. The sum of gyroscope readings associated with the newly formed bin may be the sum of the gyroscope readings for both bins in the pair.

In at least some embodiments, the method 600 maintains the number of bins in the histogram at a constant number. That is, the number of bins in the histogram 299 is the same before the method 600 is performed as it is after the method 600 is performed. While the ranges of individual bins may be affected, the number of bins is static.

The method 600 eventually causes the bin with the most gyroscope readings to continually split and increase its resolution. Accordingly, the bin which contains the bias 298 (and which contains a high concentration of measurements) will eventually become very precise. Furthermore, the splitting allows slow changing bias signals to be tracked because, after the bin with the bias is split, one of the two sides of that bin will typically take the new gyroscope readings representing the bias.

Bin Reduction

Figure 7:
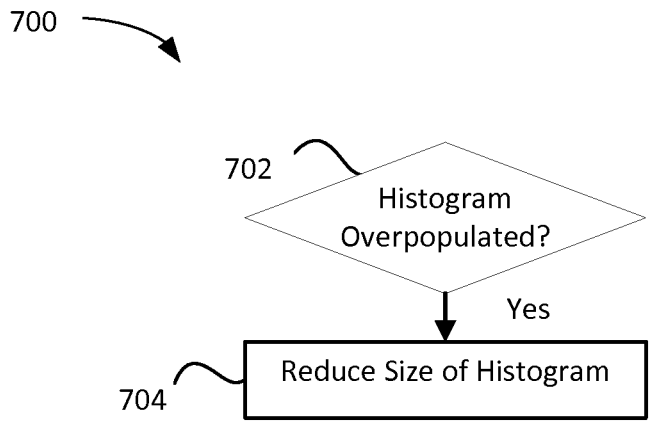
FIG. 7 is an example method of reducing the size of a histogram in accordance with example embodiments of the present disclosure.

Referring now to FIG. 7, a method 700 of reducing the size of a histogram is illustrated in flowchart form. The method 700 may, for example, be performed at 312 of the method 300 of FIG. 3.

At 702, the electronic device 201 may determine whether the histogram 299 is overpopulated. In at least some embodiments, the electronic device 201 may make this determination by comparing the bin population for the largest bin (i.e. the most populated bin) to a predetermined threshold. If the bin population exceeds the threshold, then the electronic device may determine that the histogram 299 is overpopulated. That is, the electronic device 201 determines that bin reduction is required. In at least some embodiments, the threshold is in the range of 2000 to 4000. In some embodiments, the threshold may be approximately 3000.

If the histogram 299 is overpopulated then, at 704, the electronic device 201 reduces the size of the histogram 299. In at least some embodiments, at 704, the bin population for each bin is reduced by a common factor. For example. In some embodiments, the bin population for all bins is reduced by a factor of two. In at least some embodiments, the sum of the gyroscope readings for each bin may be reduced by a common factor.

It will be appreciated that the methods described herein may be user assisted, partially user assisted, or unassisted by the device user, depending on the embodiment. Accordingly, in some embodiments such as those depicted in FIGS. 3 to 7, the determinations of bias and noise variance are dynamic and do not require user input.

While the present disclosure describes the calculation of biases for a gyroscope having three axes, in other embodiments, the gyroscope may have a different number of sensing axes (such as single axis gyroscopes or two axes gyroscopes). Accordingly, gyroscopes having one or two sensing axes, electronic devices incorporating such gyroscopes, and methods of determining bias for such gyroscopes are also within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a prerecorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-Ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A processor-implemented method of improving a gyroscope based on determining a noise variance of an axis of a gyroscope, the method comprising:
　representing, by the processor, a plurality of gyroscope readings for the axis in a histogram, the histogram including a plurality of bins associated with respective ranges;
　determining, by the processor, a bias for the axis of the gyroscope by identifying a concentration of the gyroscope readings within the histogram;
　determining, by the processor, a noise variance for the axis of the gyroscope based on features of the plurality of bins in the histogram and based on the identified concentration of gyroscope readings;
　obtaining, by the processor, a gyroscope reading; and
　correcting the gyroscope reading based on the bias and the noise variance by:
　　determining, by the processor, a measure of the difference between the gyroscope reading and the bias; and
　　determining, by the processor, whether the determined difference is greater than a variance threshold and, if so, determining that the gyroscope reading represents a movement of the gyroscope.

2. The method of claim 1, wherein the bias for the axis of the gyroscope is determined based on bin populations of the bins and wherein the bin population for a bin identifies a total number of gyroscope readings associated with that bin.

3. The method of claim 1, wherein determining a noise variance for the axis of the gyroscope comprises:
identifying, by the processor, one or more bins of the histogram that are adjacent to the bin containing the bias.

4. The method of claim 3, wherein determining a noise variance for the axis of the gyroscope further comprises:
determining, by the processor, that the identified one or more bins represent noise associated with the gyroscope.

5. The method of claim 4 wherein determining a noise variance for the axis of the gyroscope comprises:
fitting, by the processor, bin data associated with the identified one or more bins to a Gaussian curve; and
determining, by the processor, the noise variance for the axis of the gyroscope based on the Gaussian curve.

6. The method of claim 4 wherein determining a noise variance for the axis of the gyroscope comprises:
solving, by the processor, a Gaussian probability distribution function to determine the noise variance.

7. The method of claim 6, wherein solving the Gaussian probability distribution function to determine the noise variance comprises:
identifying, by the processor, a bin population associated with the bin of the histogram containing the bias;
identifying, by the processor, one or more bin populations associated with one or more adjacent bins;
identifying, by the processor, one or more distances between the bin containing the bias and one or more of the adjacent bins; and
determining, by the processor, the noise variance based on the bin population associated with the bin of the histogram containing the bias, the one or more bin populations associated with one or more adjacent bins, and the one or more distances between the bin containing the bias and one or more of the adjacent bins.

8. The method of claim 6, wherein the noise variance is determined as:

$$\text{variance} = \frac{D^2}{2 \log_e\left(\frac{P(\text{Bias})}{P(\text{Adjacent})}\right)},$$

where D is a representation of the distance between the bin containing the bias and the bins adjacent to the bin containing the bias, P(Bias) is a bin significance score associated with the bin of the histogram containing the bias, and P(Adjacent) is the average bin significance score associated with bins adjacent to the bin containing the bias.

9. The method of claim 1, further comprising:
comparing, by the processor, the number of gyroscope readings in the histogram to a predetermined threshold; and
based on the comparison, determining, by the processor, whether the histogram contains too few gyroscope readings to be reliable and, if the histogram is determined to contain too few gyroscope readings, generating an error.

10. The method of claim 1, further comprising:
prior to determining whether the determined difference is greater than the variance threshold, determining, by the processor, a variance threshold as the product of the noise variance and a predetermined value.

11. The method of claim 10, wherein determining a measure of the difference between the gyroscope reading and the bias comprises:
determining, by the processor, a square of the difference between the bias and the gyroscope reading.

12. The method of claim 1, wherein determining the bias for the axis of the gyroscope from the histogram comprises:
identifying, by the processor, a most significant bin in the histogram; and
determining, by the processor, the bias for the axis of the gyroscope based on the identified most significant bin.

13. The method of claim 1, further comprising:
adapting bin widths for the histogram.

14. The method of claim 13, further comprising, prior to adapting bin widths:
determining that bin width adaption is required based on one or more predetermined criteria.

15. The method of claim 14, wherein the predetermined criteria considers the bin population of the bin having the largest bin population.

16. The method of claim 14, wherein determining that bin width adaption is required includes:
determining a ratio of the bin population of a bin having a highest bin population and a bin population having a lowest bin population; and
determining that bin width adaptation is required by comparing the ratio to a predetermined threshold.

17. The method of claim 13, wherein adapting bin widths comprises splitting a largest bin into at least two bins.

18. An electronic device comprising:
a memory for storing a histogram;
a gyroscope; and
a processor coupled to the memory and the gyroscope, the processor being configured to:
represent a plurality of gyroscope readings for an axis of the gyroscope in the histogram, the histogram including a plurality of bins associated with respective ranges;
determine a bias for the axis of the gyroscope by identifying a concentration of the gyroscope readings within the histogram;
determine a noise variance for the axis of the gyroscope based on features of the plurality of bins in the histogram and based on the identified concentration of gyroscope readings;
obtain a gyroscope reading; and
correct the gyroscope reading based on the bias and the noise variance by:
determining a measure of the difference between the gyroscope reading and the bias; and
determining whether the determined difference is greater than a variance threshold and, if so, determining that the gyroscope reading represents a movement of the gyroscope.

19. The electronic device of claim 18, wherein the bias for the axis of the gyroscope is determined based on bin populations of the bins and wherein the bin population for a bin identifies a total number of gyroscope readings associated with that bin.

20. A non-transitory computer readable storage medium comprising computer-executable instructions for:

representing a plurality of gyroscope readings for an axis of the gyroscope in a histogram, the histogram including a plurality of bins associated with respective ranges;
determining a bias for the axis of the gyroscope by identifying a concentration of the gyroscope readings within the histogram;
determining a noise variance for the axis of the gyroscope based on features of the plurality of bins in the histogram and based on the identified concentration of gyroscope readings;
obtaining a gyroscope reading; and
correcting the gyroscope reading based on the bias and the noise variance by:
    determining a measure of the difference between the gyroscope reading and the bias; and
    determining whether the determined difference is greater than a variance threshold and, if so, determining that the gyroscope reading represents a movement of the gyroscope.

\* \* \* \* \*